June 26, 1923.

F. L. McGAHAN 1,460,168

FORCE FEED FOR POWDERED FUEL

Original Filed Jan. 3, 1918

INVENTOR:
Frederick L. McGahan,
BY
Hugh K. Wagner,
ATTORNEY.

Patented June 26, 1923.

1,460,168

UNITED STATES PATENT OFFICE.

FREDERICK L. McGAHAN, OF LOS ANGELES, CALIFORNIA; VIOLA K. WALKER, ADMINISTRATRIX OF SAID FREDERICK L. McGAHAN, DECEASED, ASSIGNOR TO THE PURPOSED MIND DEVELOPEMENT SECURITY ASSOCIATION OF THE WORLD, A TRUST COMPANY.

FORCE FEED FOR POWDERED FUEL.

Original application filed January 3, 1918, Serial No. 210,146. Patent No. 1,292,399. Divided and this application filed January 17, 1919. Serial No. 271,720.

*To all whom it may concern:*

Be it known that I, FREDERICK L. McGAHAN, a citizen of the United States, residing at the city of Los Angeles, in the county of Los Angeles and State of California, have invented certain new and useful Improvements in Force Feed for Powdered Fuel, of which the following is a specification.

This application is a division from the application of the same inventor for patent for locomotive filed January 3, 1918, Serial 210,146 which became Patent 1,292,399 Jan. 21, 1919, and relates more particularly to the force-feed for powdered fuel.

In the accompanying drawings forming part of this specification, in which like numbers of reference denote like parts wherever they occur, Figure 1 is a partial side elevation of a locomotive, to which the present invention is applied;

Figure 4 illustrates the means for rotating the screw conveyors from the turbine shaft.

Figure 1:
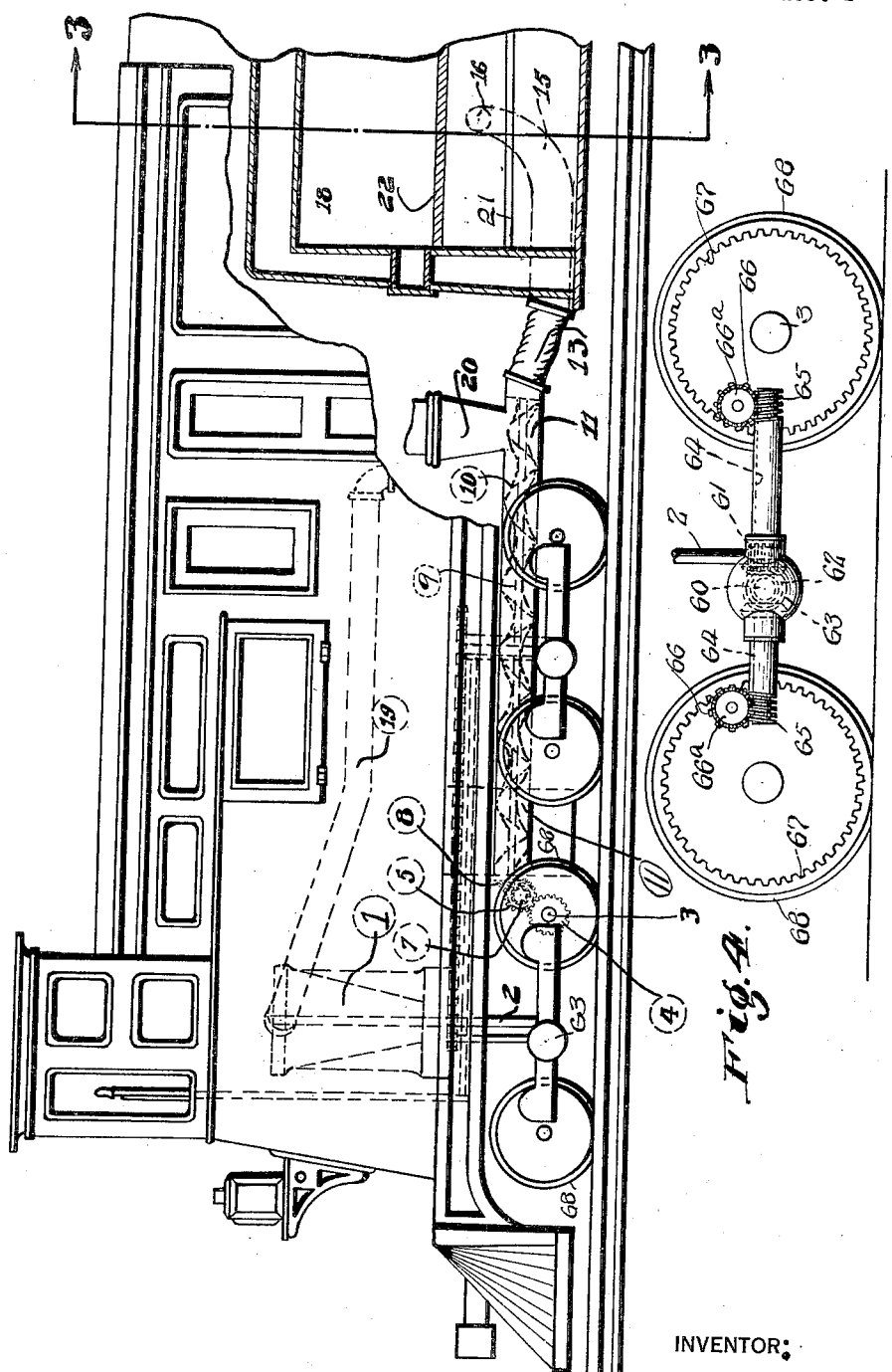

As fully described in my above mentioned patent, a turbine 1, operated by exhaust steam supplied through the pipe 19, is utilized as an auxiliary means for driving the locomotive, power being transmitted through shaft 2 from turbine 1 and through gearing to drive the axle 3.

Shaft 2 terminates in a worm 61 which engages a worm wheel 62 mounted on the shaft 60. Shaft 60 drives differentials 63 which actuate shafts 64, each of said shafts having upon its ends worms 65, which actuate worm-wheels 66ᵃ with which pinions 66 are integrally formed, which pinions run in engagement with internal gears 67 on wheels 68, and thereby rotate wheels 68 which drive the shaft 3.

Figure 2:
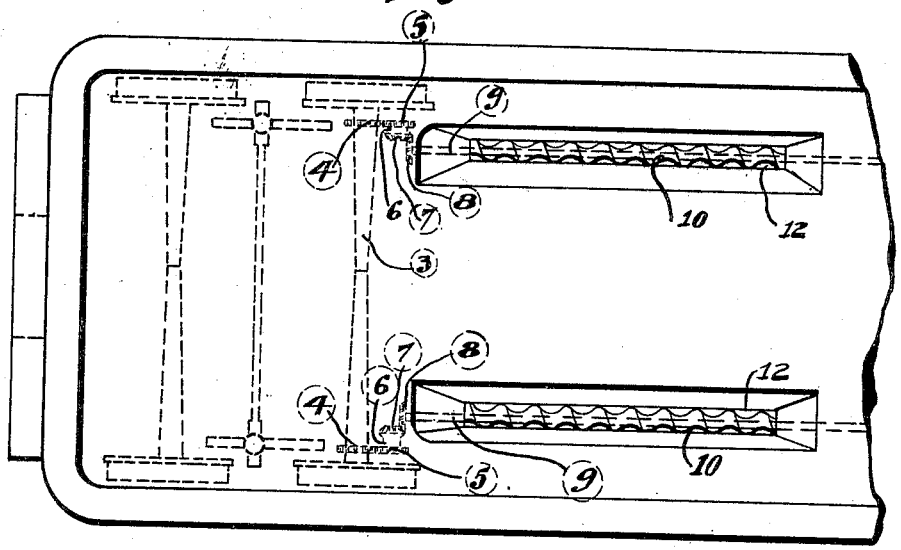
Figure 2 is a top plan view of the locomotive tender.

Gears 4 are in fixed connection with axle 3 and drive gears 5. Hubs 6 project from gears 5 and bear pinions 7 which, in turn, drive gears 8 fixed to shafts 9, to which are fixed screw conveyors 10. The screw conveyors 10 are contained within cylindrical casings 11 provided with the slots 12 at the top, to allow the gradual fall of powdered fuel from the floor of the fuel compartment or source of supply, i. e., the locomotive tender. It should be understood that slots 12 extend through the floor of the locomotive tender as clearly shown in Figure 2. The said slots do not extend clear to the end of casings 11, as it is desirable there to keep the powdered fuel confined so that the same can be forced through flexible joints 13 into pipes 15.

Figure 3:
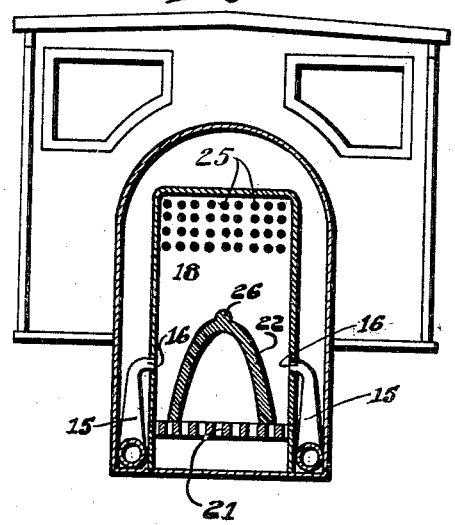
Figure 3 shows the locomotive fire-box with one form of arrangement of arch therein and inlets thereto, being a sectional view taken on the line 3—3 in Figure 1.

The constant driving of screw conveyors 10, while the locomotive is traveling, due to the uninterrupted rotation of axle 3, continuously forces powdered fuel, or the like, out of casings 11 through joints 13 into and out of pipes 15, through nozzles 16 (see Figure 3). As described in my prior patent above referred to, cinders and products of combustion are deposited in the hopper 20 and are fed together with the powdered fuel by the screw conveyor through the nozzles 16 in the manner hereinbefore described.

The force feed just described may be relied upon to supply the powdered fuel to the fire-box or suitable suction means, such as described in my patent referred to, may be used to draw in the fuel from the pipes 15 through the nozzles 16 in combination with the effect of the force feed.

The fire-box is provided with the usual grate-bars 21, upon which rests an arch 22 in the form shown in Figure 3. The arch 22 is elongated and approximately half-egg-shaped in cross section and receives the impact of powdered fuel discharged through nozzle 16 and deflects the same upwardly, in which action it is assisted by ridge 26, the result being scattering of the particles for thorough combustion. It is of course understood that a fire started in the fire-box in any suitable manner, such as by a coal fire or a temporary wood fire which will be sufficient to generate steam. Thereafter the fuel is continuously fed, and on account of its granular or powdered form, there is ready combustion as soon as it enters the fire-box. In above forms of fire-box, quicker and more certain and complete combustion is obtained than in those now common, while by the continuous feeding of pulverized fuel as provided for by this invention, a fuel supply preferable to the interrupted or spasmodic firing by firemen is obtained, resulting in greater certainty and regularity of fuel supply. This, as is well known, is necessary for a regular and reliable head of steam.

Having thus described this invention, I hereby reserve the benefit of all changes in form, arrangement, order or use of parts, as it is evident that many minor changes may be made therein without departing from the spirit of this invention or the scope of the following claims.

I claim—

1. The combination of a locomotive tender having a slot through its floor, a screw conveyor underlying the said slot, a pipe communicating with the locomotive fire-box and leading from the said screw conveyor, means for driving the said screw conveyor, the said means consisting in a gear upon one of the locomotive axles, a gear upon the said screw-shaft, and a gear member intermediate the said first-mentioned gear and the screw-shaft gear, the said gear member having one gear part adapted to be driven by the first-mentioned gear and another part adapted to drive the said screw-shaft gear.

2. The combination of a locomotive tender having a slot through its floor, a screw conveyor underlying the said slot in communication therewith, a pipe communicating with the locomotive fire-box and leading from the said screw conveyor, means for driving the said screw conveyor, the said means consisting in a gear upon one of the locomotive axles, gearing intermediate the said gear and the screw-shaft, a turbine and a shaft driven by the said turbine and communicating motion to the said axle.

In testimony whereof I hereunto affix my signature.

FREDERICK L. McGAHAN.